(12) United States Patent
Salter et al.

(10) Patent No.: US 12,315,267 B2
(45) Date of Patent: May 27, 2025

(54) SYSTEMS AND METHODS FOR DETECTING OBSTACLES IN THE VICINITY OF POWER CABLES

(71) Applicant: Ford Global Technologies, LLC, Dearborn, MI (US)

(72) Inventors: Stuart C. Salter, White Lake, MI (US); Brendan Diamond, Grosse Pointe, MI (US); Michael John Harmon, Northville, MI (US); Vyas Shenoy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 17/816,646

(22) Filed: Aug. 1, 2022

(65) Prior Publication Data

US 2024/0037958 A1 Feb. 1, 2024

(51) Int. Cl.
*G06V 20/58* (2022.01)
*B60R 16/03* (2006.01)
(Continued)

(52) U.S. Cl.
CPC .............. *G06V 20/58* (2022.01); *B60R 16/03* (2013.01); *B60W 60/0015* (2020.02);
(Continued)

(58) Field of Classification Search
CPC ... G06V 20/58; G06V 40/10; B60W 60/0015; B60W 2554/802; B60W 2420/403; B60R 16/03; G01C 21/3461; G08G 1/16
See application file for complete search history.

(56) References Cited

U.S. PATENT DOCUMENTS 10,183,563 B2   1/2019 Rayner et al.
10,773,596 B2 * 9/2020 Martin ................ B60L 3/0023
(Continued)

FOREIGN PATENT DOCUMENTS

CN       113192335 A  *  7/2021  ............. G06F 16/29
CN       114779790 A  *  7/2022  ............ G05D 1/0246
(Continued)

OTHER PUBLICATIONS

Wireless Communication Takes Electric Vehicle Charging Infrastructure to the Next Level, ublox, Mar. 21, 2022.
(Continued)

*Primary Examiner* — Rachid Bendidi
*Assistant Examiner* — Joseph Anderson Yanoska
(74) *Attorney, Agent, or Firm* — Frank Lollo; Eversheds Sutherland (US) LLP

(57) ABSTRACT

The disclosure generally pertains to systems and methods for detecting obstacles in the vicinity of power cables. In an example method, a first end of a power cable may be detected to be connected to a vehicle. A first trajectory of the power cable may then be determined via a plurality of sensors at the vehicle. The first trajectory of the power cable may include a first location and a first orientation of the power cable. It may then be determined, via the plurality of sensors at the vehicle, whether an obstacle is within a predetermined distance of the first trajectory of the power cable. Responsive to the determination that the obstacle is within the predetermined distance of the first trajectory of the power cable, a notification associated with the obstacle may be provided, and a power supply to the power cable may be turned off.

19 Claims, 5 Drawing Sheets

(51) Int. Cl.
*B60W 60/00* (2020.01)
*G06V 40/10* (2022.01)
*G01C 21/34* (2006.01)
*G08G 1/16* (2006.01)

(52) U.S. Cl.
CPC ....... *G06V 40/10* (2022.01); *B60W 2420/403* (2013.01); *B60W 2554/802* (2020.02); *G01C 21/3461* (2013.01); *G08G 1/16* (2013.01)

(56) References Cited

U.S. PATENT DOCUMENTS

| | | | | |
|---|---|---|---|---|
| 11,488,477 | B2* | 11/2022 | Yoshida | G08G 1/096783 |
| 2010/0127824 | A1* | 5/2010 | Moschl | G05B 19/4184 |
| | | | | 345/161 |
| 2011/0066515 | A1 | 3/2011 | Horvath et al. | |
| 2012/0280656 | A1 | 11/2012 | Bedell | |
| 2014/0239891 | A1* | 8/2014 | Martin | B60L 53/124 |
| | | | | 320/108 |
| 2017/0136894 | A1 | 5/2017 | Ricci | |
| 2022/0024341 | A1* | 1/2022 | Richter | G08B 21/18 |
| 2022/0309795 | A1* | 9/2022 | Jakobsen | G06V 10/70 |

FOREIGN PATENT DOCUMENTS

| | | | | |
|---|---|---|---|---|
| DE | 102015207992 | A1 * | 11/2015 | ........... B60L 11/182 |
| EP | 3883076 | A1 * | 9/2021 | ........... B65H 75/364 |
| WO | WO-2019185589 | A1 * | 10/2019 | ............. B60L 53/12 |
| WO | WO-2020254622 | A1 * | 12/2020 | ............. G06F 3/011 |

OTHER PUBLICATIONS

Autonomous Charging Station for Electric Vehicles, Artificial intelligence at the charging port, Siemens Global, Apr. 25, 2022, 1-7.

* cited by examiner

SYSTEMS AND METHODS FOR DETECTING OBSTACLES IN THE VICINITY OF POWER CABLES

BACKGROUND

Vehicles may be used to supply power to equipment at various locations, for example, a construction site. In order to power such equipment, a power cable may be connected from a power supply on board the vehicle to the equipment that is being powered. When such a power cable is in use, it may be desirable for the vehicle to be configured to detect a trajectory of the power cable in order to prevent obstacles in the vicinity from approaching or coming into contact with the power cable.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
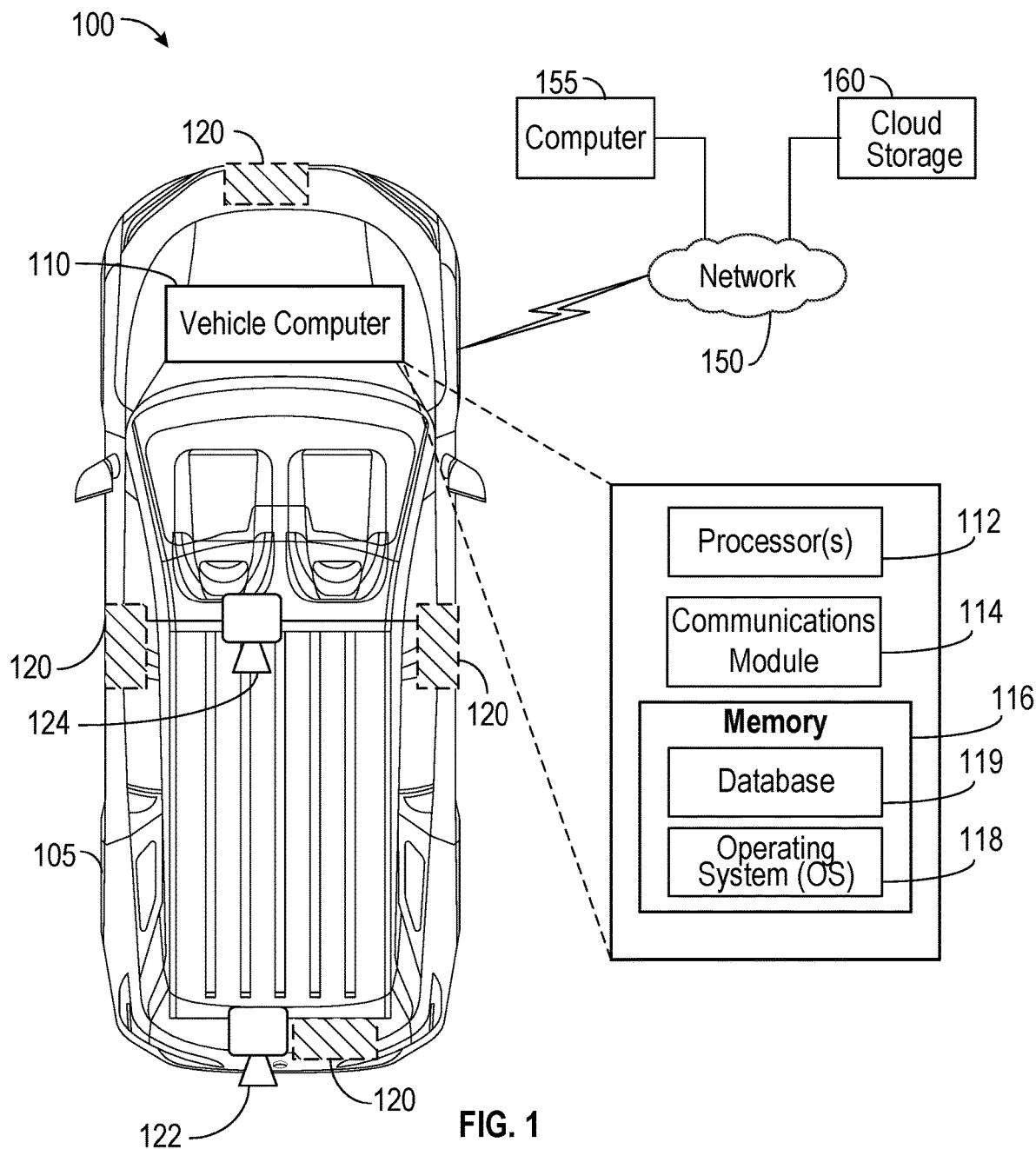
FIG. 1 illustrates an example system for detecting obstacles in the vicinity of power cables in accordance with an embodiment of the disclosure.

In terms of a general overview, certain embodiments described in this disclosure are directed to systems and methods for detecting obstacles in the vicinity of power cables. In an example method, a first end of a power cable may be detected to be connected to a vehicle. A first trajectory of the power cable may then be determined via a plurality of sensors at the vehicle. The first trajectory of the power cable may include a first location and a first orientation of the power cable. It may then be determined, via the plurality of sensors at the vehicle, whether an obstacle is within a predetermined distance of the first trajectory of the power cable. Responsive to the determination that the obstacle is within the predetermined distance of the first trajectory of the power cable, a notification associated with the obstacle may be provided, and a power supply to the power cable may be turned off.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, in this patent, the phrase "vehicle driver" may be used interchangeably with the phrase "vehicle owner," the word "user," and the word "driver." Either word as used herein refers to any individual that is utilizing a vehicle with a power cable connected to it. The word "device" may be any of various devices, such as, for example, a user device such as a smartphone or a tablet, a smart vehicle, and a computer. The word "sensor" may be any of various sensors that can be found in a vehicle, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example system 100 for detecting obstacles in the vicinity of a power cable in accordance with an embodiment of the disclosure. The system 100 may be carried out by a vehicle 105, which may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus. The system 100 may be used to detect obstacles in the vicinity of a power cable, where the power cable may be connected to the vehicle 105.

The vehicle 105 may further include components such as, for example, a vehicle computer 110. The vehicle 105 may further include various types of sensors and detectors configured to provide various functionalities. For example, as depicted in FIG. 1, the vehicle 105 may include radar sensors 120 on each side of the vehicle, at least one rear view camera 122, at least one center high-mounted stop lamp (CHMSL) camera 124, at least one front view camera, and at least one side view camera. The vehicle computer 110 may perform various operations associated with the vehicle 105, such as controlling engine operations like turning the vehicle 105 on and off, fuel injection, speed control, emissions control, braking, and other engine operations.

In some embodiments, the vehicle computer 110 may include a processor 112, a communications module 114, and a memory 116. It must be understood that the communications module 114 is a functional block that can be implemented in hardware, software, or a combination thereof. An example hardware component may include a signal processor. An example software component may include a signal processing module. The processor 112 may carry out various operations by executing computer-readable instructions stored in the memory 116. The memory 116, which is one example of a non-transitory computer-readable medium, may be used to store a database 119 for storing data and an operating system (OS) 118.

In some embodiments, the vehicle computer 110 may be configured to include various components having functions associated with providing the system 100. For example, the vehicle computer 110 may assist in determining a trajectory of the power cable and then determining obstacles in the vicinity of the power cable. In an example embodiment, the vehicle computer 110 may be communicatively coupled to other components of the vehicle 105 via wired and/or wireless connections. More particularly, the vehicle computer 110 may be communicatively coupled to the vehicle 105 via a vehicle bus that uses a controller area network (CAN) bus protocol, a Media Oriented Systems Transport (MOST) bus protocol, and/or a CAN flexible data (CAN-FD) bus protocol. In another embodiment, the communications may be provided via wireless technologies such as Bluetooth®, Ultra-Wideband (UWB), cellular, Wi-Fi, ZigBee®, or near-field communications (NFC).

In some embodiments, the vehicle computer 110 is configured to communicate via a network 150 with devices located outside the vehicle 105, such as, for example, a computer 155 (a server computer, a cloud computer, etc.) and/or a cloud storage device 160.

The network 150 may include any one, or a combination of networks, such as, for example, a local area network (LAN), a wide area network (WAN), a telephone network, a cellular network, a cable network, a wireless network, and/or private/public networks such as the Internet. The network 150 may support any of various communications technologies, such as, for example, TCP/IP, Bluetooth®, near-field communication (NFC), Wi-Fi, Wi-Fi Direct, Ultra-Wideband (UWB), cellular, machine-to-machine communication, and/or man-to-machine communication.

Figure 2A:
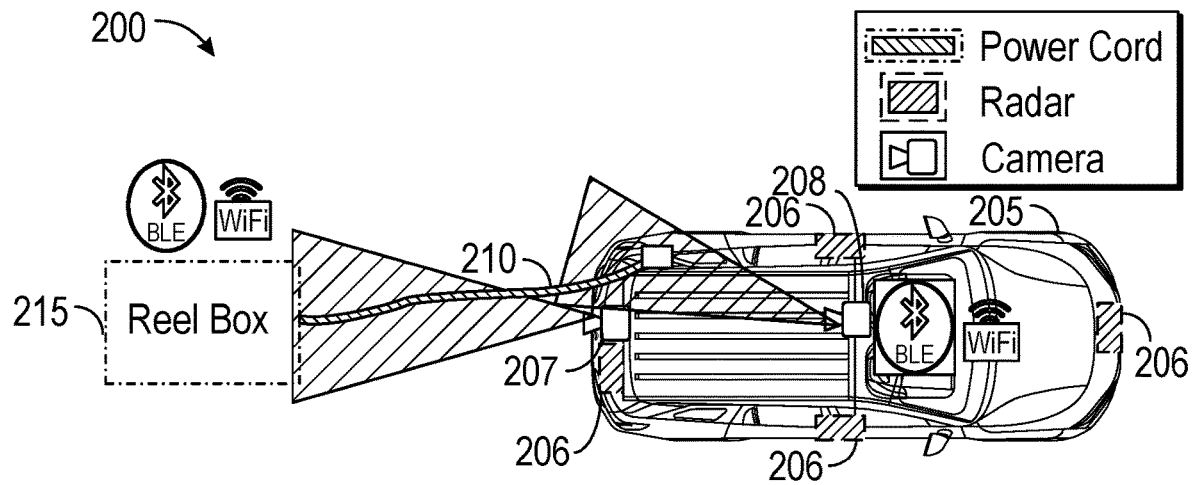
FIGS. 2A-B illustrate an example implementation of a system for detecting obstacles in the vicinity of power cables in accordance with an embodiment of the disclosure.
Figure 2B:
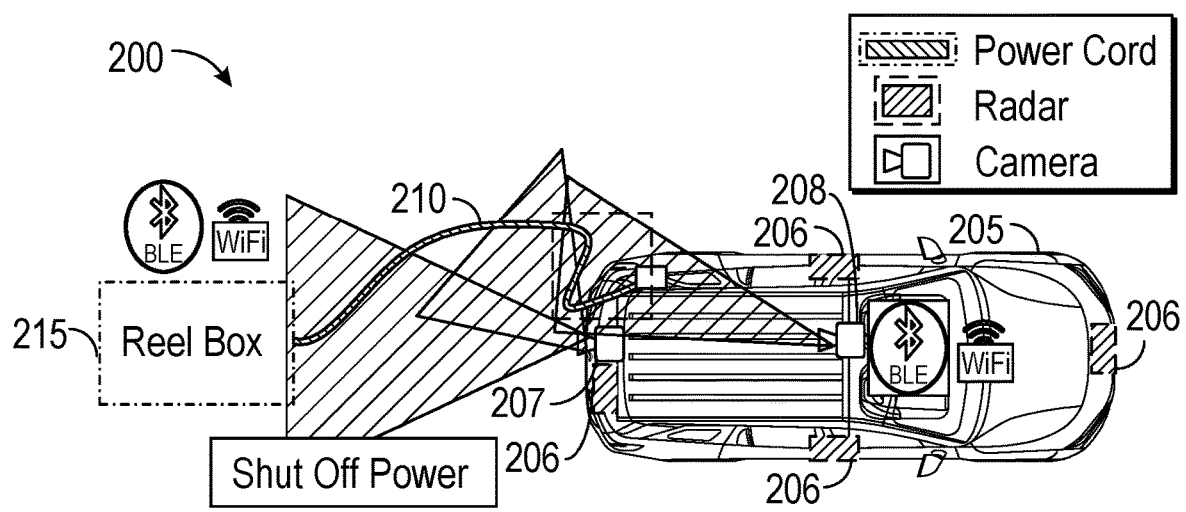

FIGS. 2A-B illustrate an example implementation of a system 200 for detecting obstacles in the vicinity of a power cable in accordance with an embodiment of the disclosure. The system 200 may involve a vehicle 205. In one example, as depicted in FIGS. 2A-B, the vehicle 205 may be a truck having a truck bed. In such an example, a power cable 210 may be connected to the vehicle 205 via a power source in the truck bed. It should be noted that the power cable 210 may be connected to any appropriate power source in the vehicle 205. The vehicle 205 may be configured to determine that the power cable 210 is connected to the vehicle 205. In some embodiments, the vehicle 205 may determine that the power cable 210 is in use by determining that one end of the power cable 210 is connected to the vehicle 205 and that the power cable 210 has been extended from the vehicle 205 via a plurality of sensors at the vehicle 205. The plurality of sensors may include radar sensors 206, rear view cameras 207, CHMSL cameras 208, and other appropriate sensors that may be capable of detecting the power cable 210 as being connected to a power source on board the vehicle 205 and as being extended from the vehicle 205. The power cable 210 being extended from the vehicle 205 may include the power cable 210 being connected at a distal second end to equipment that is external to the vehicle 205. In one example, the power cable 210 may be further connected to a reel box 215. In other examples, the power cable 210 may be further connected to an adapter reel or power outlet. In other embodiments, the vehicle 205 may determine that the power cable 210 is in use via user input.

In some embodiments, as depicted in FIG. 2A, after the vehicle 205 has determined that the power cable 210 is in use, where the power cable 210 is connected to the vehicle 205 and extended from the vehicle 205, the vehicle 205 may be configured to determine a trajectory of the power cable 210. The trajectory of the power cable 210 may include a location of the power cable 210 and an orientation of the power cable 210. The determination of the trajectory of the power cable 210 may be based at least in part on data received from the plurality of sensors at the vehicle 205. For example, the rear view camera(s) 207 and/or the CHSML camera(s) 208 may be configured to identify the location of the power cable 210 and the orientation of the power cable 210 based at least on images obtained from the rear view camera(s) 207 and/or the CHSML camera(s) 208 and at least one image-recognition-based algorithm. Other cameras, such as front view cameras and side view cameras, and radar sensors 206 may also be used to detect the location of the power cable 210 if the power cable 210 is not disposed directly behind the vehicle 205. The trajectory of the power cable 210 may further be determined based data received from wireless communications to equipment, for example, the reel box 215, that is connected to the distal second end of the power cable 210. In some instances, the wireless communications may be transmitted to a Bluetooth® Low Energy (BLE) or Ultra-Wideband (UWB) beacon of the equipment or via Wi-Fi communications, and the trajectory of the power cable 210 may be estimated if the power cable 210 is in tension. In some embodiments, the vehicle 205 may further be configured to use focused exterior lights to illuminate the trajectory of the power cable 210. In some embodiments, if lights are integrated into the power cable 210, the vehicle 205 may be configured to power the lights that are integrated into the power cable 210 so as to illuminate the power cable 210.

In some embodiments, if the vehicle 205 is an autonomous vehicle, the vehicle 205 may be configured to automatically reposition itself in order for any of the sensors of the plurality of sensors to possess a field of view to determine the location of the power cable 210.

In some embodiments, the vehicle 205 may be configured to be capable of moving, if it is safe to do so, while the power cable 210 is connected to the vehicle 205 at one end and the reel box 215 at another distal end. If the vehicle 205 is in motion, the vehicle 205 may be configured to detect whether the power cable 210 has been fully extended. In the alternative, if the vehicle 205 is in motion, the vehicle 205 may be configured to detect whether the power cable 210 has reached its maximum extension. The maximum extension of the power cable 210 may be a percentage of a length of the power cable 210. In some instances, the full extension or the maximum extension of the power cable 210 may be detected based at least in part on a tension of the power cable 210.

In some instances, as depicted in FIG. 2B, responsive to determining that the full extension or the maximum extension of the power cable 210 has been reached, the vehicle 205 may be configured to detect a location of the reel box 215 based on wireless communications to the BLE/UWB beacon of the reel box 215. The vehicle 205 may then align itself as needed and reverse towards the reel box 215, so as to reduce the extension of the power cable 210, while maintaining a fixed tension on the power cable 210. In some instances, while the power cable 210 is being reeled back in as the vehicle 205 reverses, the speed at which the power cable 210 is reeled back in may be limited to ensure that the power cable 210 can be easily reeled in. For example, the speed at which the power cable 210 is reeled back in may be limited to a walking speed. In some instances, the vehicle 205 may stop reversing and/or notify a vehicle operator if the vehicle 205 detects that it is within a predetermined distance of the reel box 215, if a reduced tension is detected in the power cable 210, and/or if an obstacle is detected proximate to the vehicle 205. In such an embodiment, the vehicle 205 may use the plurality of sensors, including the rear view camera(s) 207, the radar sensors 206, and the CHMSL camera(s) 208, while moving, if it is safe to do so, to ensure that the power cable 210 is not run over by a wheel of the vehicle 205 as the vehicle 205 travels backwards towards the reel box 215. This may include the plurality of sensors identifying a current location of the power cable 210 and ensuring that the power cable 210 has not shifted positions such that the power cable 210 is disposed proximate to a wheel of the vehicle 205. In some embodiments, if a length of the power cable 210 that is greater than necessary for connecting the vehicle 205 to the reel box 215 is preferred, upon receiving such instructions from a vehicle operator, the vehicle 205 may align itself as needed and reverse towards the reel box 215 without reeling the power cable 210 back in. As depicted in FIG. 2B, if the power cable 210 is detected to have moved to be proximate to a wheel of the vehicle 205, the vehicle 205 may be configured to immediately stop moving, and the vehicle 205 may be further configured to turn off power to the power outlet that is connected to the power cable 210. The vehicle 205 may further be configured to notify a vehicle operator to move, if it is safe to do so, the power cable 210 out of the way of the wheels of the vehicle 205. If the vehicle 205 subsequently detects that the power cable 210 has been moved to not be proximate to the wheels of the vehicle 205, the power supply to the power outlet that is connected to the power cable 210 may be turned on, and the vehicle 205 may resume moving, if it is safe to do so. If the vehicle operator does not move the power cable 210 further away from the wheels of the vehicle 205, the power supply may remain turned off.

Figure 3A:
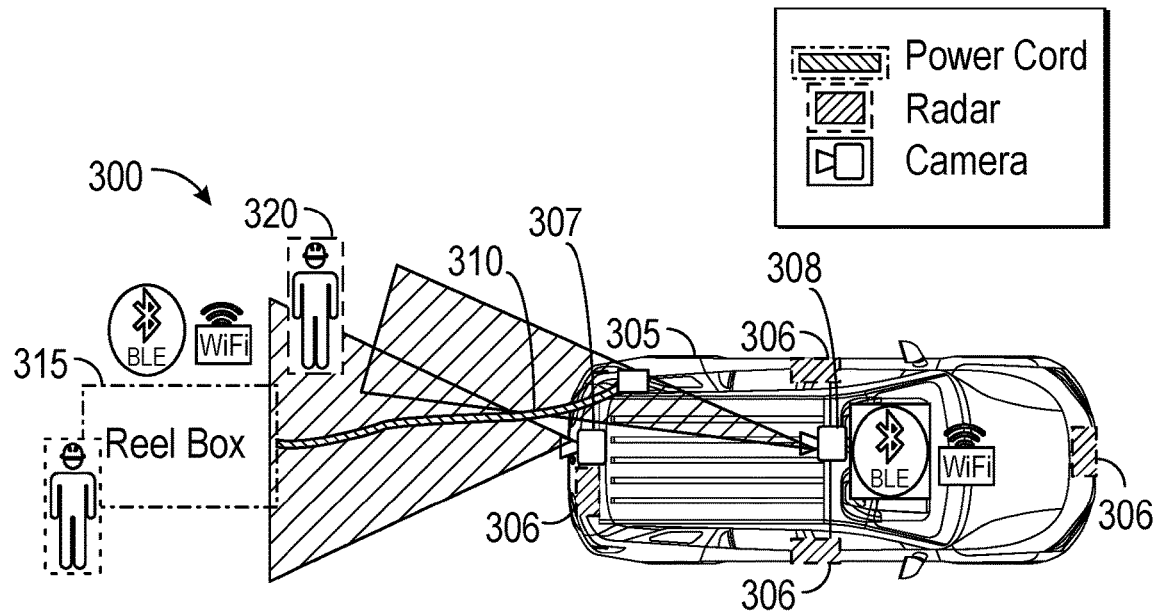
FIGS. 3A-B illustrate an example implementation of a system for detecting obstacles in the vicinity of power cables in accordance with an embodiment of the disclosure.
Figure 3B:
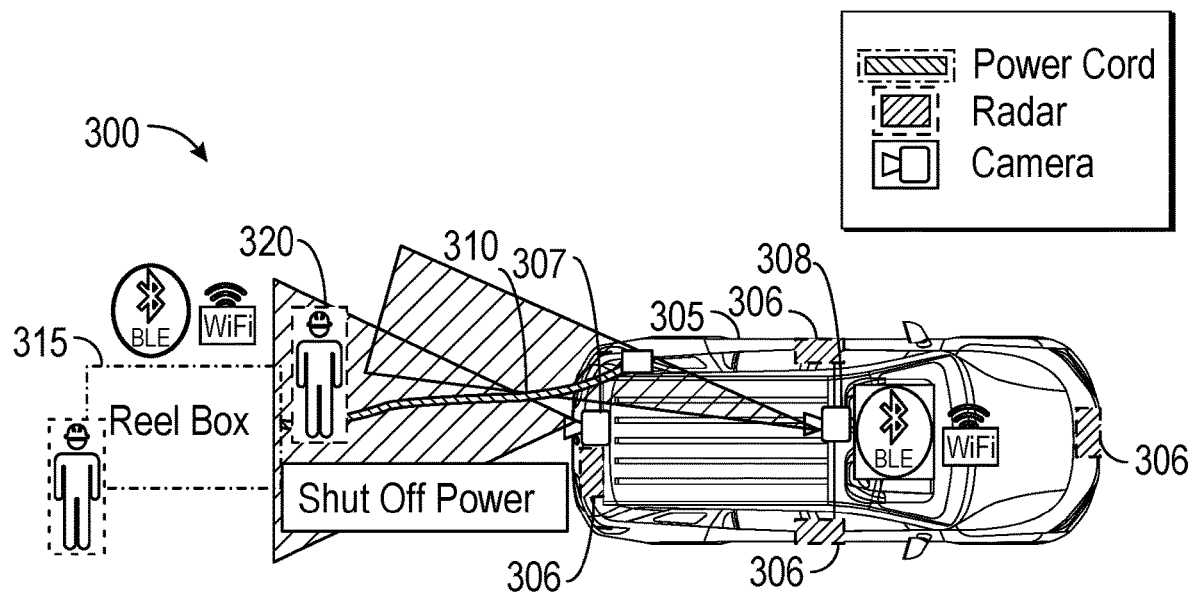

FIG. 3 illustrates an example implementation of system 300 for detecting obstacles in the vicinity of a power cable in accordance with an embodiment of the disclosure. The system 300 may involve a vehicle 305. In one example, as depicted in FIGS. 3A-B, the vehicle 305 may be a truck having a truck bed. In such an example, a power cable 310 may be connected to the vehicle 305 via a power source in the truck bed. It should be noted that the power cable 310 may be connected to any appropriate power source in the vehicle 305. The vehicle 305 may be configured to determine that the power cable 310 is connected to the vehicle 305. In some embodiments, the vehicle 305 may determine that the power cable 310 is in use by determining that one end of the power cable 310 is connected to the vehicle 305 and that the power cable 310 has been extended from the vehicle 305 via a plurality of sensors at the vehicle 305. The plurality of sensors may include radar sensors 306, rear view cameras 307, CHMSL cameras 308, and other appropriate sensors that may be capable of detecting the power cable 310 as being connected to a power source on board the vehicle 305 and as being extended from the vehicle 305. The power cable 310 being extended from the vehicle 305 may include the power cable 310 being connected at a distal second end to equipment that is external to the vehicle 305. In one example, the power cable 310 may be further connected to a reel box 315. In other examples, the power cable 310 may be further connected to an adapter reel or power outlet. In other embodiments, the vehicle 305 may determine that the power cable 310 is in use via user input.

In some embodiments, after the vehicle 305 has determined that the power cable 310 is in use, where the power cable 310 is connected to the vehicle 305 and extended from the vehicle 305, the vehicle 305 may be configured to determine a trajectory of the power cable 310. The trajectory of the power cable 310 may include a location of the power cable 310 and an orientation of the power cable 310. The determination of the trajectory of the power cable 310 may be based at least in part on data received from the plurality of sensors at the vehicle 305. For example, the rear view camera(s) 307 and/or the CHSML camera(s) 308 may be configured to identify the location of the power cable 310 and the orientation of the power cable 310 based at least on images obtained from the rear view camera(s) 307 and/or the CHSML camera(s) 308 and at least one image-recognition-based algorithm. Other cameras, such as front view cameras and side view cameras, and radar sensors 306 may also be used to detect the location of the power cable 310 if the power cable 310 is not disposed directly behind the vehicle 305. The trajectory of the power cable 310 may further be determined based data received from wireless communications to equipment, for example, the reel box 315, that is connected to the distal second end of the power cable 310. In some instances, the wireless communications may be transmitted to a Bluetooth® Low Energy (BLE) or Ultra-Wideband (UWB) beacon of the equipment, and the trajectory of the power cable 310 may be estimated if the power cable 310 is in tension.

In some embodiments, if the vehicle 305 is an autonomous vehicle, the vehicle 305 may be configured to automatically reposition itself in order for any of the sensors of the plurality of sensors to possess a field of view to determine the location of the power cable 310.

In some embodiments, the vehicle 305 may be configured to be capable of identifying obstacles that may be located within a predetermined distance of the trajectory of the power cable 310. For example, the obstacles 320 may include other vehicles, workers or other people, and/or other objects that may be proximate to or may come into contact with the power cable 310. If the vehicle 305 detects that at least one obstacle 320 is located within a predetermined distance of the trajectory of the power cable 310, the vehicle 305 may be configured to communicate to the at least one obstacle 320 about the location of the reel box 315 (or other equipment) and the trajectory of the power cable 310 in order to prevent the at least one obstacle from coming into contact with the power cable 310. In some instances, the communication may take the form of providing a map to the at least one obstacle 320 to indicate areas that the at least one obstacle 320 should avoid due to the proximity of the area to the power cable 310. For example, if the at least one obstacle 320 is another vehicle, the map may be provided to an infotainment center of the another vehicle. In some instances, if the another vehicle is an autonomous vehicle, the another vehicle may be configured to be automatically prohibited from entering the areas that are indicated on the map. In another example, if the at least one obstacle 320 is a worker, the map may be provided to a mobile phone of the worker. In some instances, if the vehicle 305 detects that the at least one obstacle 320 is located within the predetermined distance of the trajectory of the power cable 310, the vehicle 305 may be configured to notify the at least one obstacle 320 via beeping, exterior sound exciters mounted to the vehicle 305, flashing lights, and/or any other modes of notification so as to provide awareness of the power cable's 310 trajectory to the at least one obstacle 320.

In some instances, responsive to receiving a communication or other notification of the location of the reel box 315 (or other equipment) and the trajectory of the power cable 310, the at least one obstacle 320 may be capable of responding to the vehicle 305 to acknowledge awareness of the location of the reel box 315 (or other equipment) and the trajectory of the power cable 310. For example, the at least one obstacle 320 may respond in an audio format and/or provide a physical response. In some instances, the vehicle 305 may be configured to maintain or restore a power supply to the power cable 310 if the at least one obstacle 320 is detected to have responded to the vehicle 305 to acknowledge awareness of the location of the reel box 315 (or other equipment) and the trajectory of the power cable 310, or if the at least one obstacle 320 is detected to have moved outside of the predetermined distance of the trajectory of the power cable 310.

In other instances, as depicted in FIG. 3A, if the at least one obstacle 320 is a vehicle, or a worker or other person, the vehicle 305 may be configured to detect whether the at least one obstacle 320 is an unauthorized worker/vehicle or an authorized worker/vehicle. An authorized worker/vehicle may include workers/vehicles who are using the power cable 310 as part of their job function. In some embodiments, the vehicle 305 may be configured to detect authorized workers/vehicles based on a current time of day (for example, whether a worker/vehicle is scheduled to work in the vicinity of the power cable 310 at the current time of day), a BLE or radio frequency identification (RFID) tag on a vehicle or a helmet or other item worn by a worker, a color of an apparel or other item worn by a worker, and/or facial recognition technologies for identifying workers. In such instances, if the worker/vehicle is detected by the vehicle 305 to be an authorized worker/vehicle, the vehicle 305 may be configured to not turn off the power supply to the power cable 310, and the vehicle 305 may be configured to not communicate to the authorized worker/vehicle about the location of the reel box 315 (or other equipment) and the trajectory of the power cable 310.

However, as depicted in FIG. 3B, if the at least one obstacle 320 is not detected to be an authorized worker/vehicle, and the at least one obstacle 320 does not respond to the communications from the vehicle 305 about the location of the reel box 315 (or other equipment) and the trajectory of the power cable 310 and continues to approach the power cable 310, the vehicle 305 may be configured to turn off the power supply to the power cable 310. If the at least one obstacle 320 comes into contact with the power cable 310, the vehicle 305 may be configured to turn off the power supply to the power cable 310 until the power cable 310 has been inspected.

In some instances, when the power cable 310 is in use, the power cable 310 and/or a power outlet on the vehicle 305 that is connected to the power cable 310 may be configured to be lit up. In some instances, the power cable 310 may be configured to issue an alert to indicate that power is flowing through the power cable 310.

In some instances, the vehicle 305 may be configured to use the CHMSL camera(s) 308 to determine if a power cable 310 is unplugged from the vehicle 305. If a vehicle operator begins to walk away from the vehicle 305 without closing a door of the vehicle 305 while the power cable 310 is unplugged, the vehicle 305 may be configured to provide the vehicle operator with a notification to close the door of the vehicle 305.

Figure 4:
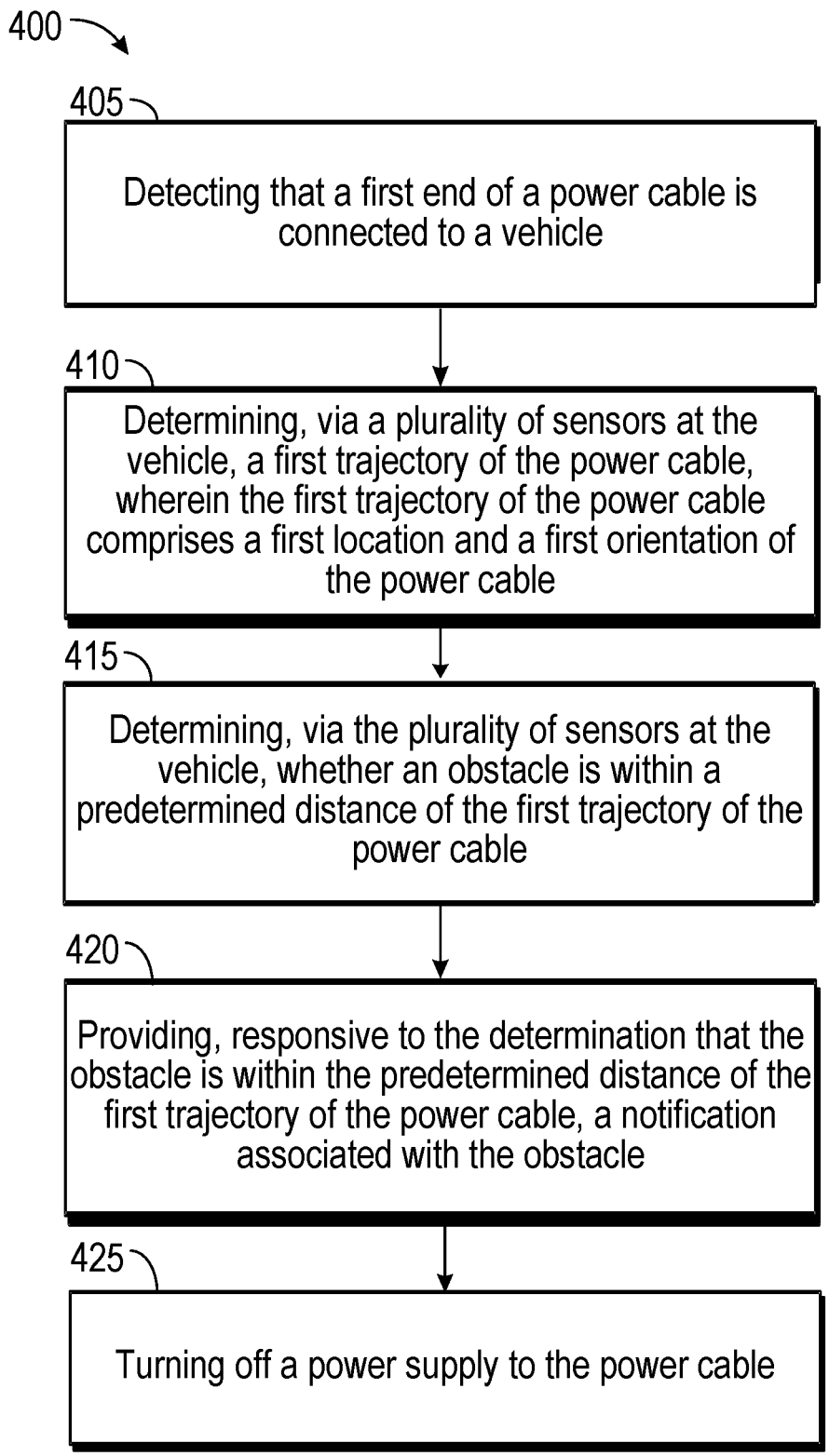
FIG. 4 depicts a flow chart of an example method for detecting obstacles in the vicinity of power cables in accordance with the disclosure.

FIG. 4 shows a flow chart 400 of an example method of detecting obstacles in the vicinity of power cables in accordance with the disclosure. The flow chart 400 illustrates a sequence of operations that can be implemented in hardware, software, or a combination thereof. In the context of software, the operations represent computer-executable instructions stored on one or more non-transitory computer-readable media such as a memory 116 provided in the vehicle computer 110, that, when executed by one or more processors such as the processor 112 provided in the vehicle computer 110, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 400 may be carried out by the vehicle computer 110 either independently or in cooperation with other devices such as, for example, other components of the vehicle 105 and cloud elements (such as, for example, the computer 155 and cloud storage 160.

At block 405, a first end of a power cable may be detected to be connected to a vehicle.

At block 410, a first trajectory of the power cable may be determined via a plurality of sensors at the vehicle. The first trajectory of the power cable may include a first location and a first orientation of the power cable. In some embodiments, the first trajectory of the vehicle may be determined based at least in part on a plurality of cameras at the vehicle and at least one image-recognition-based algorithm.

At block 415, it may be determined, via the plurality of sensors at the vehicle, whether an obstacle is within a predetermined distance of the first trajectory of the power cable. In some embodiments, the vehicle is a first vehicle, and wherein the obstacle is one of an unauthorized person, a second vehicle, or a wheel of the first vehicle. In some embodiments, the unauthorized person is identified based on at least one of a tag on a helmet associated with the unauthorized person, a color of a clothing item associated with the unauthorized person, and a face of the unauthorized person.

At block 420, responsive to the determination that the obstacle is within the predetermined distance of the first trajectory of the power cable, a notification associated with the obstacle may be provided.

At block 425, a power supply to the power cable may be turned off.

In some embodiments, subsequent to the notification associated with the obstacle being provided, it may be determined that the obstacle is not within the predetermined distance of the first trajectory of the power cable. In some embodiments, the power supply may then be restored to the power cable.

In some embodiments, an alert may be provided to at least one potential obstacle within a geographic area associated with the vehicle but not within the predetermined distance to the first trajectory of the power cable, wherein the alert is in the form of a map that depicts areas that should be avoided.

In some embodiments, a distal second end of the power cable is connected to a reel box. It may be determined that the power cable is extended to a predetermined maximum extension, wherein the predetermined maximum extension comprises a percentage of a length of the power cable. The vehicle may then automatically move, if it is safe to do so, towards the reel box. It may be determined, via the plurality of sensors at the vehicle, that a portion of the power cable is within a threshold distance of a wheel of the vehicle. Responsive to the determination that the portion of the power cable is within the threshold distance of the wheel of the vehicle, the vehicle may be stopped.

Figure 5:
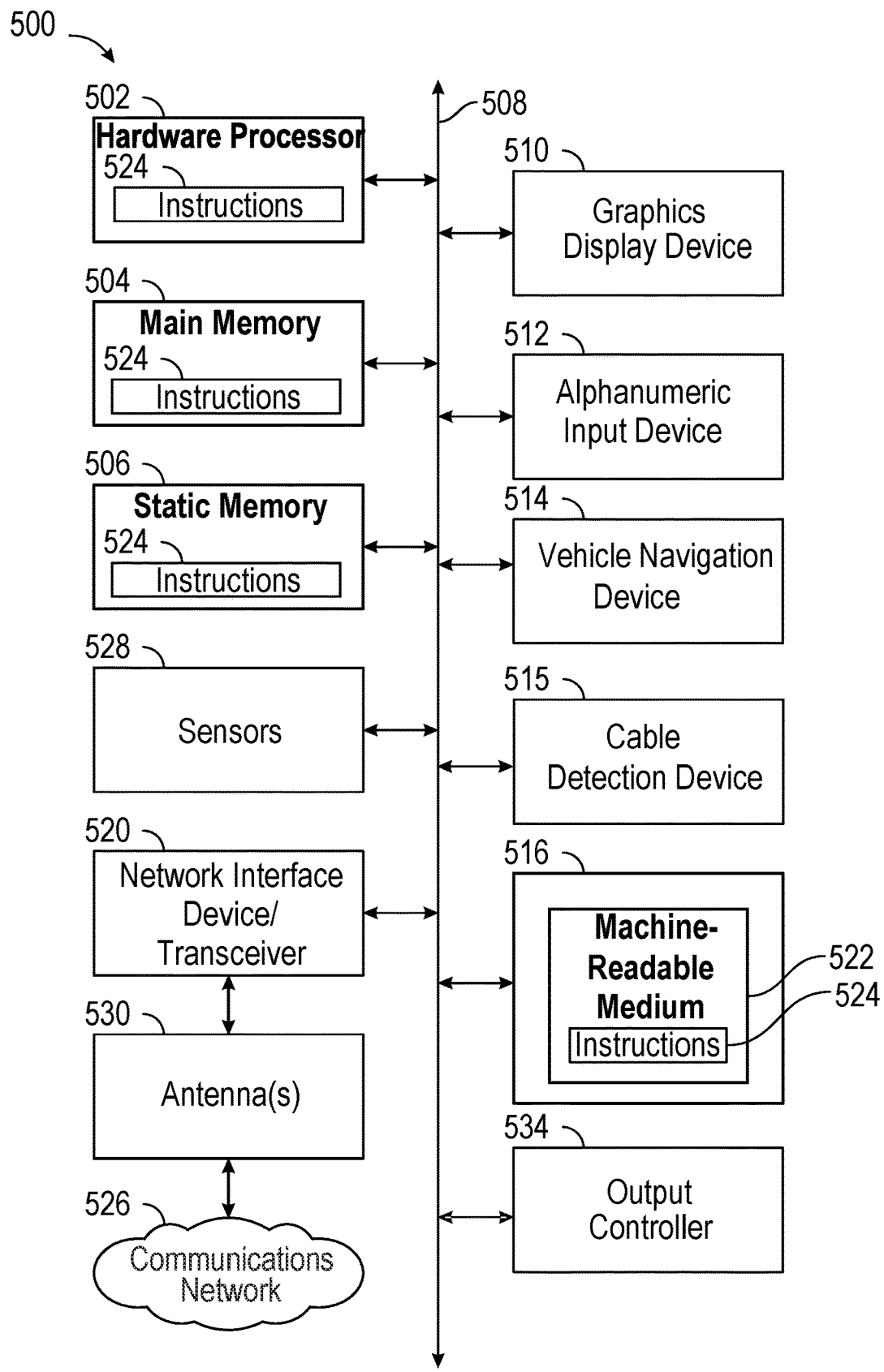
FIG. 5 depicts a block diagram of an example machine upon which any of one or more techniques (e.g., methods) may be performed, in accordance with an embodiment of the disclosure.

FIG. 5 depicts a block diagram of an example machine 500 upon which any of one or more techniques (e.g., methods) may be performed, in accordance with one or more example embodiments of the present disclosure. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 500 may be the vehicle 105, as depicted in FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a graphics display device 510, an alphanumeric input device 512 (e.g., a keyboard), a vehicle navigation device 514, and a cable detection device 515. In an example, the graphics display device 510, the alphanumeric input device 512, the vehicle navigation device 514, and the cable detection device 515 may be a touch screen display. The machine 500 may additionally include a storage device (i.e., drive unit) 516, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth□, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 112, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 116, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting that a first end of a power cable is connected to a vehicle;
   determining, via a plurality of sensors at the vehicle, a first trajectory of the power cable, wherein the first trajectory of the power cable comprises a first location and a first orientation of the power cable;
   determining, via the plurality of sensors at the vehicle, that an obstacle is within a predetermined distance of the first trajectory of the power cable;
   providing, responsive to the determination that the obstacle is within the predetermined distance of the first trajectory of the power cable, a notification associated with the obstacle, wherein the notification includes information about the first trajectory of the power cable;
providing an alert, to another vehicle that is within a geographic area associated with the vehicle but not within the predetermined distance, wherein the alert comprises a map that depicts areas that should be avoided;
turning off a power supply to the power cable;
receive, from the obstacle, an acknowledgement of the first trajectory of the power cable; and
restore the power supply to the power cable based on the acknowledgement.

2. The method of claim 1, wherein the vehicle is a first vehicle, and wherein the obstacle comprises one of an unauthorized person, a second vehicle, or a wheel of the first vehicle.

3. The method of claim 2, wherein the unauthorized person is identified based on at least one of a tag on a helmet associated with the unauthorized person, a color of a clothing item associated with the unauthorized person, and a face of the unauthorized person.

4. The method of claim 1, further comprising:
determining, subsequent to the notification associated with the obstacle being provided, that the obstacle is not within the predetermined distance of the first trajectory of the power cable; and
restoring the power supply to the power cable.

5. The method of claim 1, wherein the first trajectory of the power cable is determined based at least in part on a plurality of cameras at the vehicle and at least one image-recognition-based algorithm.

6. The method of claim 1, wherein a distal second end of the power cable is connected to a reel box, and further comprising:
determining that the power cable is extended to a predetermined maximum extension, wherein the predetermined maximum extension comprises a percentage of a length of the power cable;
automatically moving the vehicle towards the reel box;
determining, via the plurality of sensors at the vehicle, that a portion of the power cable is within a threshold distance of a wheel of the vehicle; and
responsive to the determination that the portion of the power cable is within the threshold distance of the wheel of the vehicle, stopping the vehicle.

7. The method of claim 1, wherein the other vehicle displays the map on a screen of the other vehicle.

8. A device, comprising:
at least one memory device that stores computer-executable instructions; and
at least one processor configured to access the at least one memory device, wherein the at least one processor is configured to execute the computer-executable instructions to:
detect that a first end of a power cable is connected to a vehicle, wherein a distal second end of the power cable is connected to a reel box;
determine, via a plurality of sensors at the vehicle, a first trajectory of the power cable, wherein the first trajectory of the power cable comprises a first location and a first orientation of the power cable;
determine, via the plurality of sensors at the vehicle, whether an obstacle is within a predetermined distance of the first trajectory of the power cable;
provide, responsive to the determination that the obstacle is within the predetermined distance of the first trajectory of the power cable, a notification associated with the obstacle;
provide an alert to another vehicle in that is within a geographic area associated with the vehicle but not within the predetermined distance, wherein the alert comprises a map that depicts areas that should be avoided;
turn off a power supply to the power cable;
determine that the power cable is extended to a predetermined maximum extension, wherein the predetermined maximum extension comprises a percentage of a length of the power cable;
automatically move the vehicle towards the reel box;
determine, via the plurality of sensors at the vehicle, that a portion of the power cable is within a threshold distance of a wheel of the vehicle; and
responsive to the determination that the portion of the power cable is within the threshold distance of the wheel of the vehicle, stop the vehicle.

9. The device of claim 8, wherein the vehicle is a first vehicle, and wherein the obstacle comprises one of an unauthorized person, a second vehicle, or a wheel of the first vehicle.

10. The device of claim 9, wherein the unauthorized person is identified based on at least one of a tag on a helmet associated with the unauthorized person, a color of a clothing item associated with the unauthorized person, and a face of the unauthorized person.

11. The device of claim 8, wherein the at least one processor is further configured to execute the computer-executable instructions to:
determine, subsequent to the notification associated with the obstacle being provided, that the obstacle is not within the predetermined distance of the first trajectory of the power cable; and
restore the power supply to the power cable.

12. The device of claim 8, wherein the first trajectory of the power cable is determined based at least in part on a plurality of cameras at the vehicle and at least one image-recognition-based algorithm.

13. The device of claim 8, wherein the notification includes information about the first trajectory of the power cable and wherein the at least one processor is further configured to execute the computer-executable instructions to:
receive, from the obstacle, an acknowledgement of the first trajectory of the power cable; and
restore the power supply to the power cable based on the acknowledgement.

14. A device, comprising:
at least one memory device that stores computer-executable instructions; and
at least one processor configured to access the at least one memory device, wherein the at least one processor is configured to execute the computer-executable instructions to:
detect that a first end of a power cable is connected to a vehicle;
determine, via a plurality of sensors at the vehicle, a first trajectory of the power cable, wherein the first trajectory of the power cable comprises a first location and a first orientation of the power cable;
determine, via the plurality of sensors at the vehicle, whether an obstacle is within a predetermined distance of the first trajectory of the power cable;
provide, responsive to the determination that the obstacle is within the predetermined distance of the first trajectory of the power cable, a notification associated with the obstacle, wherein the notification includes information about the first trajectory of the power cable;

provide an alert to another vehicle in that is within a geographic area associated with the vehicle but not within the predetermined distance, wherein the alert comprises a map that depicts areas that should be avoided;

turn off a power supply to the power cable;

receive, from the obstacle, an acknowledgement of the first trajectory of the power cable; and restore the power supply to the power cable based on the acknowledgement.

15. The device of claim 14, wherein the vehicle is a first vehicle, and wherein the obstacle comprises one of an unauthorized person, a second vehicle, or a wheel of the first vehicle.

16. The device of claim 15, wherein the unauthorized person is identified based on at least one of a tag on a helmet associated with the unauthorized person, a color of a clothing item associated with the unauthorized person, and a face of the unauthorized person.

17. The device of claim 14, wherein the at least one processor is further configured to execute the computer-executable instructions to:

determine, subsequent to the notification associated with the obstacle being provided, that the obstacle is not within the predetermined distance of the first trajectory of the power cable; and restore the power supply to the power cable.

18. The device of claim 14, wherein the first trajectory of the power cable is determined based at least in part on a plurality of cameras at the vehicle and at least one image-recognition-based algorithm.

19. The device of claim 14, wherein a distal second end of the power cable is connected to a reel box, and wherein the at least one processor is further configured to execute the computer-executable instructions to:

determine that the power cable is extended to a predetermined maximum extension, wherein the predetermined maximum extension comprises a percentage of a length of the power cable;

automatically move the vehicle towards the reel box;

determine, via the plurality of sensors at the vehicle, that a portion of the power cable is within a threshold distance of a wheel of the vehicle; and responsive to the determination that the portion of the power cable is within the threshold distance of the wheel of the vehicle, stop the vehicle.

* * * * *